United States Patent
Sun et al.

(10) Patent No.: US 12,024,680 B2
(45) Date of Patent: Jul. 2, 2024

(54) PROCESS FOR PVC-CONTAINING MIXED PLASTIC WASTE PYROLYSIS

(71) Applicant: UOP LLC, Des Plaines, IL (US)

(72) Inventors: Ping Sun, Hinsdale, IL (US); Jeffrey Tyska, Chicago, IL (US); Joseph A. Montalbano, Elmhurst, IL (US)

(73) Assignee: UOP LLC

( * ) Notice: Subject to any disclaimer, the term of this patent is extended or adjusted under 35 U.S.C. 154(b) by 0 days.

(21) Appl. No.: 17/367,336

(22) Filed: Jul. 3, 2021

(65) Prior Publication Data
US 2022/0010213 A1 Jan. 13, 2022

Related U.S. Application Data (60) Provisional application No. 63/050,704, filed on Jul. 10, 2020.

(51) Int. Cl.
*C10G 1/10* (2006.01)
*B01D 15/08* (2006.01)
(Continued)

(52) U.S. Cl.
CPC .............. *C10G 1/10* (2013.01); *B01D 15/08* (2013.01); *C10B 53/07* (2013.01); *C10G 31/06* (2013.01); *F23G 5/027* (2013.01); *B01D 2215/00* (2013.01); *B01D 2257/204* (2013.01); *C10G 2300/1003* (2013.01); *Y02P 20/143* (2015.11)

(58) Field of Classification Search
None
See application file for complete search history.

(56) References Cited

U.S. PATENT DOCUMENTS

| | | | | |
|---|---|---|---|---|
| 5,608,136 A | * | 3/1997 | Maezawa ............... | C10G 1/10 588/317 |
| 6,858,562 B1 | * | 2/2005 | Takasu ............... | B01D 53/8662 423/544 |

(Continued)

FOREIGN PATENT DOCUMENTS

| EP | 2516592 B1 | 6/2018 |
|---|---|---|
| JP | H05170922 A | 7/1993 |

(Continued)

OTHER PUBLICATIONS

Machine translation JP 11-050062, retrieved Sep. 15, 2022. (Year: 2022).*

(Continued)

*Primary Examiner* — In Suk C Bullock
*Assistant Examiner* — Alyssa L Cepluch
(74) *Attorney, Agent, or Firm* — Paschall & Associates, LLC; Mark Goldberg (57) ABSTRACT

A process for pyrolysis of a mixed plastic stream that contains polyvinyl chloride (PVC) is provided in which the chloride from PVC is removed from an initial melting reactor that heats the mixed plastic stream to a sufficient temperature to produce HCl but at a low enough temperature to avoid production of organochlorides. Chloride is primarily removed in a vapor stream from the initial melting reactor, while additional chloride removal may be removed downstream from the melting reactor by the use of sorbent addition to the pyrolysis reactor and by subsequent adsorbent beds.

18 Claims, 2 Drawing Sheets

(51) Int. Cl.
  *C10B 53/07*  (2006.01)
  *C10G 31/06*  (2006.01)
  *F23G 5/027*  (2006.01)

(56) References Cited

U.S. PATENT DOCUMENTS

| | | | |
|---|---|---|---|
| 8,668,810 B1 * | 3/2014 | Vardanyan | C10G 9/24 |
| | | | 201/19 |
| 9,200,207 B2 | 12/2015 | Huang et al. | |
| 9,725,655 B2 | 8/2017 | Gephart et al. | |
| 2015/0053589 A1 * | 2/2015 | Vilasrao Dalal | C10G 67/06 |
| | | | 196/46 |
| 2016/0264874 A1 * | 9/2016 | Narayanaswamy | C10G 1/10 |
| 2017/0073584 A1 | 3/2017 | Bordynuik | |
| 2017/0218278 A1 | 8/2017 | Bakaya et al. | |
| 2017/0233657 A1 | 8/2017 | McNamara et al. | |
| 2017/0283706 A1 | 10/2017 | Schabel et al. | |
| 2017/0361558 A1 | 12/2017 | Tenore et al. | |
| 2019/0275486 A1 * | 9/2019 | Peltekis | C10B 45/00 |

FOREIGN PATENT DOCUMENTS

| | | |
|---|---|---|
| JP | H0776688 A | 3/1995 |
| JP | 09085046 A | 3/1997 |
| JP | 0011050062 A | 2/1999 |
| JP | 2002069459 A | 3/2002 |
| RU | 2211343 C1 | 8/2003 |
| WO | 2019004560 A1 | 1/2019 |
| WO | 2020008050 A1 | 1/2020 |

OTHER PUBLICATIONS

PCT/US2021/070837, International Search Report and Written Opinion, date of mailing Oct. 28, 2021.
Examination Report for corresponding Indian Application No. 202317001620, Provided Nov. 15, 2023.
Office Action for corresponding JP Application No. 2023-501447 dated Mar. 4, 2024.

* cited by examiner

Fig 1

PROCESS FOR PVC-CONTAINING MIXED PLASTIC WASTE PYROLYSIS

FIELD

This application claims priority from provisional application 63/050704 filed on Jul. 10, 2020, which is incorporated herein in its entirety.

The general field is the pyrolyzing of a plastic waste stream into hydrocarbons while minimizing the amount of mixed plastic sorting that is required. Particularly, the disclosure relates to production of valuable and upgradable pyrolysis oil that meets chloride quality specifications at downstream upgrading facilities.

BACKGROUND OF THE INVENTION

Mixed plastic waste originates from curbside waste collection of post-consumer plastic waste. Mixed plastic waste also comes from specific industrial sites e.g., construction, packaging and agricultural wastes that have a broad range of compositions. The waste recycling facility applies a sorting process to recover recyclable plastics. Mixed plastic waste is what is left after sorting. This is considered to be at the end of its life and is commonly sent landfill or incineration. Chemical recycling by the pyrolysis process is able to convert end of life plastic waste to a fuel or petrochemical feedstock substitute under an air-free atmosphere and higher temperature conditions, e.g. 350° C. to 900° C.

In spite of variations in mixed plastic feed, mixed plastic waste broadly defined contains comingled plastics of all seven types, i.e. polyethylene terephthalate (PET), low-density and high-density polyethylene (PE), polypropylene (PP), polyvinyl chloride (PVC), polystyrene (PS) and other miscellaneous plastics coming from a variety of post-consumer products, e.g., electronic waste, automobile waste, polyurethane foam packaging, carpet nylon, etc. Other impurities such as trace metals as compounding additives to enhance performance from polymerization processes may exist in mixed feed waste. In addition, small amounts of non-plastics such as paper, wood and food residue also exist.

The mixed plastic streams have already been through sorting steps at a material recovery facility. It typically requires additional sorting before it is processed in a chemical process. The objective of additional sorting is to leave problematic contaminants out of the recycling process. Non-plastics, e.g., metal, dirt and wood are obviously undesired. Not all plastics are suitable to pyrolysis processing: PVC is particularly undesirable due to its chloride derivatives in products that may harm downstream process metallurgy if left untreated. To achieve high efficiency in rejecting a contaminant, a sorting process may be applied in front of pyrolysis processes involving a combination of common techniques, e.g., shredding, magnetic, eddy current, gravity separation, optical and/or electrostatic sorting. The sorting may be very complex and costly. It is desirable to apply process steps to remove contaminant. It is a task of this invention to achieve contaminant removal during chemical recycling instead of investing heavily in pre-sorting step. This invention focuses on chloride derivatives originated from PVC in a feed. Without costly sorting steps to remove most PVC out before the pyrolysis unit, it is unlikely to treat chloride down to an acceptable level with prior art processes. In downstream industry, the target is preferably lower than 10 ppw of chloride in pyrolysis product. Any technology may not achieve 99.999% chloride removal efficiency in single step which is needed to handle ~2% PVC in feed. This invention teaches a method that treats PVC-containing feed down to low Cl range that is suitable for petrochemical or refinery feedstock, such as <10 ppw in product using a series of steps that produce synergetic effect, e.g., for a feed containing ~1-6% wt PVC.

Stepwise chloride removal must be achieved through a capable reactor type and efficient heat supply strategy. Prior art taught plastic waste pyrolysis by using a rotary kiln (US20170283706A1, US201702182786A1) or extrusion equipment (U.S. Pat. No. 10,233,393). Transport of the products, including char, may involve operating the rotary kiln at a certain rotary flies, or utilizing an auger-type device. Most commonly, heat is transferred indirectly through the reactor wall by fuel gas firing, electrical heating or a hot oil medium. Heat transfer into reactants relies on the coefficient of conductivity between the wall and reactants. This results in a large temperature gradient in the reactor. The process fluid near the wall is much hotter than the process fluid away from the heated wall. The net effect is excessive char deposit originating from the fluid near the hotter wall and poorer heat transfer as a result. Excessive char deposit further behaves as a heat insulator that leads to a greater heat gradient along the wall and wall-layer fluid. Uniform heat distribution in the reactor should result in lower char yields, and higher product yields. Such a heated system also limits the size of the pyrolysis process.

Use of convective heat transfer from inside the pyrolysis reactor helps avoid the issues with indirect heating discussed as mentioned above. This is typically done by circuiting a process stream and heating it through an external heater or an exchanger so that it acts as a heating medium for the reactor (US20140114098A1). The circulating heat medium may thermally crack however, which creates complications with selection of the heating fluid. The plastic itself also has a low thermal conductivity which means that a larger amount of heat medium may be required. US20140114098A1 discloses use of a crude oil as a heat transfer aid to overcome low thermal conductivity of the melted plastic feed. Crude oil and its distillation fractions are known to crack significantly at the temperatures seen in the pyrolysis reactor. This means that a continuous supply of crude oil is required. This poses a practical challenge when such a supply is difficult to obtain and adds extra cost to the process. A process stream is a better choice of heating medium as it solves this sourcing issue. The circulated process-derived product stream must be free of large metal solids and large char solids to avoid heater fouling and exchanger fouling. Through novel reactor design, a pyrolysis pumparound stream can have its solid content minimized so that the stream is not erosive or fouling and can supply the heating medium requirements.

Accordingly, there is a need for a robust process that handles mixed plastic, especially one that minimizes the amount of pre-sorting of plastic feed in front of pyrolysis reactors. The process must handle polyvinyl chloride in the feed, a common component, and must minimize the chloride in the product that comes from pyrolyzing polyvinyl chloride. The reactor system should run continuously and effectively rejects any detrimental solids, such as any additives in the reaction system for a smooth process operation while utilizing a process stream to maintain high heat transfer efficiency to the reactor.

BRIEF SUMMARY

Various embodiments contemplated herein relate to processes and apparatuses for pyrolyzing a mixed plastic waste stream from a high-PVC in feed to produce a low chloride content oil product. The exemplary embodiments taught herein provide a process for pyrolyzing a mixed plastic waste stream. The embodiments also illustrate a necessary stepwise process that enables the aforementioned process.

In accordance with an exemplary embodiment, a process for pyrolyzing a mixed plastic waste stream is provided. The process comprises pyrolyzing a minimally sorted mixed plastic waste stream. The mixed plastic waste stream may contain 1-6% wt PVC in a feed with limited chloride removal effort through presorting prior to entering a pyrolysis process. The waste plastics first contact a hot liquid stream that is produced from the process in a melting reactor. This melting reactor melts the waste plastics and produces a vapor stream which is described in further detail later herein. The bottoms liquid from the melting reactor may be pumped or pressured into a pyrolysis reactor where the melting reactor bottoms stream is cracked into a vapor stream and a bottoms liquids stream. The pyrolysis reactor contains a significant inventory of liquid material produced in the polymerization reactor. A portion of this liquid mixes with the plastic feed in the melting reactor to provide sensible heat and heat of melting. The rest of this liquid is heated and provides all remaining heat of reaction and heat of vaporization at the pyrolysis reactor. The heat source is a gaseous or liquefied fuel that is burned and provides heat required for reaction and latent heat in the reactor. The heated liquid stream has a higher temperature than the main reactor as it provides all of the heat needed for the pyrolysis reaction.

In accordance with another exemplary embodiment, a process for pyrolyzing a PVC containing feed while minimizing the amount of chloride in the product is provided. High chloride removal has been found to require a stepwise method to meet product specification requirements. It requires a minimum of two steps and may require three steps to achieve a low product Cl level. The first step of the dechlorination process comprises a partial conversion of polyvinyl chloride to hydrogen chloride in the melting step. The hydrogen chloride from this reaction is contained in the melting reactor vapor stream and is directly sent to the incinerator to burn off along with any hydrocarbon gas, and to possibly help provide heat for the pyrolysis reactor. Next, hydrogen chloride rich gas produced from pyrolysis reactor is further removed while liquid products is progressively condensed. Optionally, a finely ground solid sorbent is added to the reactor to enhance the fixation of chlorine by reacting sorbent with hydrogen chloride product. The solid sorbent is an alkaline rich and inexpensive reactant that reacts with residual chloride. Through condensing, hydrogen chloride rich is separated from main pyrolysis oil product. The condensed pyrolysis oil product is sent to a post treatment bed. A small bed of adsorbent further removes chloride content of the product to nearly zero percent. The synergy utilizing the stepwise approach to treat Cl from >5800 ppw in feed to 10 ppw in product with the processes and apparatuses described herein is previously unknown. The invention discloses a synergetic method for chloride removal, the first dechlorination tank size may be much smaller than main cracking reactor. The amount of adsorbent needed in these beds is minimized by the other steps described above. The final polishing chloride removal step is in economical using an adsorbent solution as part of this invention. The invention eliminates the need for extensive presorting at the feed end when a mixed plastic feed has a high PVC content, e.g. >1% wt. The invention achieves a low chlorine level in final pyrolysis oil product, such as <10 ppwm in product, or <6 ppm preferably that single technique may not achieve in a practical scale with the processes and apparatuses described.

The process utilizes a continuous reactor to provide a method for sustaining heat integration, pyrolysis operation and solid separation despite using the minimally sorted mixed plastic feed.

These and other features, aspects, and advantages of the present disclosure will become better understood upon consideration of the following detailed description, drawings and appended claims.

BRIEF DESCRIPTION OF THE DRAWINGS

The various embodiments will hereinafter be described in conjunction with the following FIGURES, wherein like numerals denote like elements.

DEFINITIONS

As used herein, the term "reactor" means a thermal cracking vessel that provides residence time for feed polymers. The melting tank reactor is a reactor where only a portion of a mixed plastic feed is pyrolyzed when the majority of the mixed plastic feed goes through physical melting into a viscous liquid. The main pyrolysis reactor types are introduced above, a well-mixed reactor type of using convective heat transfer has advantages over indirectly conductivity heater transfer offered by a kiln or a screw extruder. Well-mixed reactor sees uniform temperature distribution established throughout the liquid space.

As used herein, the term "mixed plastic feed" means two or more polymers are present in the feed.

As used herein, the term "product" means a portion of mass stream, after the pyrolysis reaction. A product can be broad as main products that may be sold for profit, a stream that is a byproduct when aiming for the main profitable product. In the current context, the pyrolysis reaction produces residue gaseous product containing a hydrocarbon gas, in 5-10% wt of the melt feed, a liquid when condensed to room condition in 70-90wt% of yield, 2-15% wt of a residue that leaves from reactor discharge as a mix of liquid and solid that may not have high profit such as it is considered as a byproduct.

As used herein, the term "residue" means a portion remaining after a process step. In the current context, a residue is specifically a stream that leaves the process boundary as a mix of liquid and solid that has relatively lower profitable use to downstream applications than the main product.

As used herein, the term "char" is a solid material remaining after a plastic feed stream has been pyrolyzed. A char is a carbonaceous byproduct that is commonly embedded in a residue stream. A char is a necessary byproduct when making main product. A reaction strategy may be applied to reduce char, but it cannot be eliminated. Certain plastic compositions contribute to yielding char in higher amount than another. It is known that rigid plastic and aromatic molecule containing plastic compounds, such as PVC, PET, PS or acrylonitrile butadiene styrene from electronic waste tend to make more char than polyethylene and polypropylene at comparable processing conditions.

As used herein, the term "solids" are materials in a solid state. As mentioned above, the mixed plastic may contain layered additives introduced during polymer manufacturing processes. One example is MgO, CaO and $Li_2O$ based glass fiber species. Another example is zinc, lead or cadmium based metallic fillers when forming conductive plastics. Metal or alkali metal ends up in the residue stream in a solid format. Another form of solids may come from a sorbent that is useful for reacting chloride-containing molecules when in reaction. Examples include a calcium-based sorbent in hydroxide, oxides or its carbonates, frequently from a naturally occurring mineral.

As used herein, the term "portion" means an amount or part taken or separated from a main stream without any change in the composition as compared to the main stream. Further, it also includes splitting the taken or separated portion into multiple portions where each portion retains the same composition as compared to the main stream.

As used herein, the term "unit" can refer to an area including one or more equipment items and/or one or more sub-units. Equipment items can include one or more reactors or reactor vessels, heaters, separators, drums, exchangers, pipes, pumps, compressors, and controllers. Additionally, an equipment item, such as a reactor, dryer, or vessel, can further include one or more units or sub-units.

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "direct communication" or "directly" means that flow from the upstream component enters the downstream component without undergoing a compositional change due to physical fractionation or chemical conversion.

The term "chloride" means that chlorine that are chemically compounded in variety of format in PVC in feed, product oil, or product vapor stream in either organic format or inorganic format.

As used herein, the term "settling" refers to a solid and liquid separation, specifically having solids travel downward to or within a reactor vessel. When a solid tends to settle, its carrier liquid cannot provide the velocity as it is needed to continue to accelerate or prevent it from dropping off from a continuous spectrum of liquid flow solely by liquid-solid drag force. The critical liquid velocity is frequently known as "terminal velocity" or "settling velocity". When a solid settles, it has a slip velocity from liquid average velocity, or it falls behind. When this occurs to a swarm of solid, solids tend to build up concentrations in a gradient due to lag in solid transport or form a sediment when liquid travels in a pipe or a vessel.

As used herein, the term "quality". Pyrolysis product quality refers to many chemical compositions that make it more or less suitable to a downstream application. A common objective of mixed plastic pyrolysis is to create a product that can be used in a downstream refinery. Its hydrocarbon content is important measure of quality. In particular, a key quality measure relevant to this invention is chloride content. The chloride content, either in organic or inorganic format, tends to lead to metallurgy corrosion.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description. The figures have been simplified by the deletion of a large number of apparatuses customarily employed in a process of this nature, such as vessel internals, temperature and pressure controls systems, flow control valves, recycle pumps, etc. which are not specifically required to illustrate the performance of the process. Furthermore, the illustration of the current process in the embodiment of a specific drawing is not intended to limit the process to specific embodiments set out herein.

As depicted, process flow lines in the figures can be referred to, interchangeably, as, e.g., lines, pipes, branches, distributors, streams, effluents, feeds, products, portions, catalysts, withdrawals, recycles, suctions, discharges, and caustics.

Figure 1:
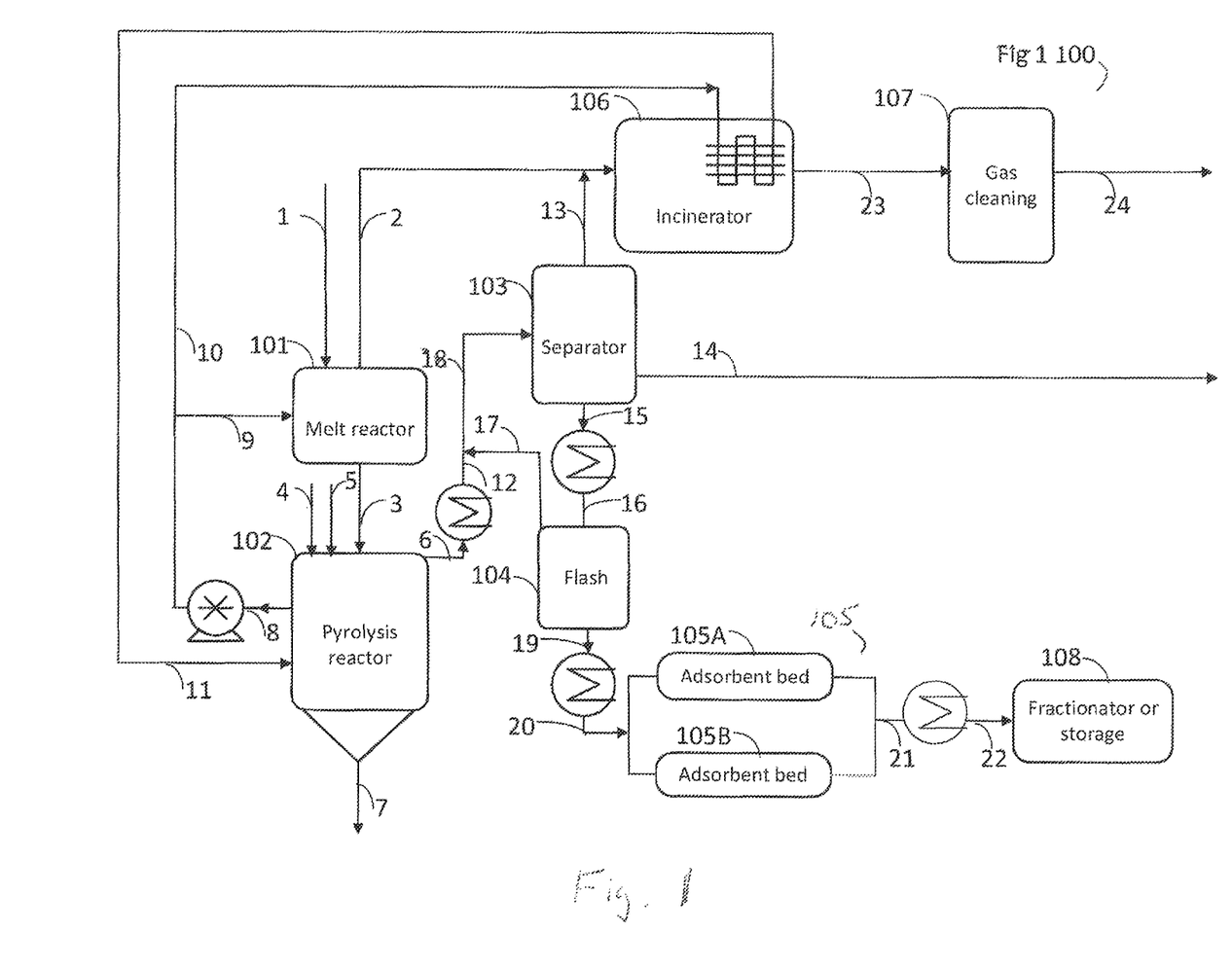
FIG. 1 is a schematic diagram of a process and an apparatus for pyrolyzing a mixed plastic stream in accordance with an exemplary embodiment.

A mixed plastic waste pyrolysis process for pyrolyzing a polyvinyl chloride containing waste stream with a metal and char product is provided. The process for pyrolyzing a plastic waste stream is addressed with reference to a process and an apparatus 100 according to an embodiment as shown in FIG. 1. Referring to FIG. 1, the process and apparatus 100 comprise a melting reactor 101, a pyrolysis reactor 102, separation units 103 and 104, an adsorbent system 105A and 105B, a waste gas burning and oil heat exchanger section (also referred to as incinerator) 106, a gas cleaning section 107, and finally a product designation section that has optional fractionation and storage 108.

In an embodiment, the mixed plastic residue stream may comprise miscellaneous plastic waste comprising seven types of plastic classes, polyethylene terephthalate, low-density and high-density polyethylene, polypropylene, polyvinyl chloride, polystyrene and other miscellaneous plastics. At least one type of plastic is polyvinyl chloride. The US Environmental Protection Agency reported in Advancing Sustainability Material Management: 2016 and 2017 Tables and Figures shows on US average that ~3% polyvinyl chloride, ~13% polyethylene terephthalate, ~7% polystyrene and ~11% other plastic and undefined ended up in 2017 waste plastic mix going to landfills. Relative amounts of each plastic type vary depending on the location of collection of recycled plastic.

Other miscellaneous plastics may originate from a variety of post-consumer products, including, acrylonitrile butadiene styrene found in electronic waste, polyurethane foam packaging, carpet nylon and polysulfone. The mixed plastic residue stream is also commonly known as containing impurities such as paper, wood, aluminum foil, some metallic conductive fillers or halogenated or non-halogenated flame retardants. During a pyrolysis reaction, some of these impurities may contribute to heteroatoms in product streams. Among all heteroatoms in main products, chloride originated from polyvinyl chloride is the most concerning for quality due to its link to metallurgy corrosion.n In an embodiment, the mixed plastic waste at the processing end of a material recovering facility (MRF) that is otherwise sent to a landfill is used for pyrolysis feedstock. In FIG. 1, the mixed feed stream is received with minimal sorting at the MRF site and is added in the system as a densified flake or a pellet. Mixed feed stream 1 is added to melting reactor 101. When mixed plastic waste is being pyrolyzed, 1 wt % polyvinyl chloride produces ~5800 ppmw hydrogen chloride in theory on a fresh feed rate basis. A mixed feed stream with minimal sorting may contain >1% wt PVC in it. Cold mixed plastic material mixes with a hot liquid stream 9 to reach a temperature of 300-350° C. The melting reactor 101 functions as a dechlorination reactor and may operate at a temperature from about 200° C. (392° F.) to about 350° C. (662° F.), or preferably about 280° C. (536° F.) to about 320° C. (608° F.), a pressure from about 0.069 MPa (gauge) (10 psig) to about 1.38 MPa (gauge) (200 psig), or preferably about 0.138 MPa (gauge) (20 psig) to about 0.345 MPa (gauge) (50 psig), a liquid hourly space velocity of the fresh melt feed from about 0.1 hr-1 to about 2 hr-1, or preferably from about 0.2 hr-1 to about 0.5 hr-1, and under a nitrogen blanket or a dedicated nitrogen sweeping rate of about 1.7 Nm3/m3 (10 scf/bbl) to about 170 Nm3/m3 of plastic melt (1,000 scf/bbl), or preferably about 17 Nm3/m3 (100 scf/bbl) to about 850 Nm3/m3 plastic melt (500 scf/bbl). The system 100 has a melting reactor 101 that is equipped with a mixer to keep the plastic melt well mixed until melting is mostly complete. The melting reactor may still leave a fraction of feed chloride unconverted. This invention provides a stepwise dechlorination method that economically enables a high chloride removal efficiency using a combination of steps. In this invention, the product quality target may be less than 40 ppmw, or <10 ppmw chlorine or preferably <6 ppmw with a mixed plastic containing high PVC content, e.g., 1-6% wt. Such an objective cannot be practically and economically achieved in single process step. In the melting reactor 101 polyvinyl chloride is mostly pyrolyzed through an "unzipping" reaction where chloride molecules are removed through a free radical reaction and abstract hydrogen in nearby sites to form hydrogen chlorides. The reaction is also known as a "dechlorination" reaction. The temperature of the melting reactor 101 is selected to melt the majority of plastic components yet barely reach their cracking temperature to maximize yield of hydrogen chlorides and minimize the amount of reactive olefins and other organochlorides being formed. Thermal dechlorination involves heating PVC-containing mixed plastic feed in oxygen-free environment. Chloride in PVC pyrolyzes at ~280° C., appreciable dechlorination reaction rate occurs ~300° C. Chloride-containing free radicals from PVC tends to abstract hydrogen to become stabilized molecular form. Other plastics in mixed feed also start melting at >~300° C. Polystyrene starts pyrolyzing at ~320° C. and other plastic types may stat pyrolyzing at ~340° C. or higher with appreciable conversions. Chloride-containing free radicals from PVC or newly formed hydrogen chloride tends to combine with an olefinic ligand forming a chloride-containing molecule. Chloride-containing molecules once formed lead to chloride contaminated pyrolysis oil product. In the melt tank, formation of chloride-containing molecules through recombination reactions may be minimized by carefully designing melt tank conditions. As described above, melt tank temperature is preferably about 280° C. (536° F.) to about 320° C. (608° F.) to focus only on dechlorination of PVC and melting of other plastic. Dechlorination reaction rate is a function of temperature and residence time. Lower operating temperature requires larger reactor volume to complete PVC dechlorination reaction. For example, when feed contains ~2% wt PVC or ~1.16% wt chloride in theory, a 99.999% dechlorination efficiency is needed to achieve the target chloride removal in single step. In practical application, it is not achievable. In a single tank reactor, we found dechlorination efficiency approximately follows first order kinetic law, the efficiency increases with reactor size or residence time but returns on dechlorination conversions upon increasing reactor size is diminishing at higher conversion as widely known by first-order CSTR reaction kinetics. Therefore, it is not practical for a single step dechlorination reactor to achieve more than 90% dechlorination efficiency. To measure a process' practicality, when a dechlorination reactor is greater in size than the main cracking reactor, the pretreatment step exceeds main reaction needs, it exceeds "practical" design thread hold. Limited by practical constraint, a single dechlorination reactor may have a practical dechlorination removal about 90%, or more practically from around 80% to around 90%. Presumably not obviously, additional constraints apply further lowering the practical Cl conversion at the melt tank. For example, heat transfer limitations slow down the overall reaction rates, preferably a stream from main reactor is circulated to the melt tank reactor to eliminate the heating barrier due to heat conductivity instead of heating a melt tank externally through vessel wall. It resolves the slow conductivity issue and coking due to hotter wall; a trade-off is the circulation liquid requires more residence time to convert chloride from PVC. In conclusion, a higher than 90% dechlorination conversion in the melt tank is considered as impractical. Our invention may not limit to the reactor design taught, however, our teaching on reactor design enables the invention in terms of producing low-chlorine product. Additional synergetic steps using different techniques are further taught below to achieve efficiency needed to reach low chlorine in product.

Any chlorine in unconverted PVC or organochlorides left in the melting reactor bottoms continue with further completion of thermal breakdown in the pyrolysis reactor forming hydrogen chloride and its hydrocarbon derivatives. At the same main reactor conditions, majority of plastic mix is thermally decomposed to a range of hydrocarbon molecules, namely, parrafins, olefins and aromatics in a carbon number ranging from 1 to 50 or higher. Heteroatom containing molecules also exist. Remaining chloride molecules that survive the first low temperature melting step are different in molecule formation from its parent molecules. They require higher activation energy or elevated temperatures to convert to chloride radicals. Two possible routes for forming stabile organochloride products exist. The hydrogen chloride combining pyrolytic hydrocarbon product is a known path for organochloride molecules in the liquid phase pyrolysis reactors. New-born chloride free radicals may also directly react with cracked hydrocarbon thus stabilizing the forming organochloride molecules. The organochloride formation window coincides with a wide range of operating conditions covering pyrolysis and condensing conditions, e.g., 50-450° C. As stated, the net outcome is organochloride carried by pyrolysis products as a result of either reaction mechanism leads to poor product quality. Not all hydrogen chloride is chemically converted to organochloride, hydrogen chloride formed in the main pyrolysis reactor escapes with non-condensable vapor when the build of product is condensed in a liquid format. Optionally as an enhancement to dechlorination in main cracking reactor, a sorbent can be added to further improve dechlorination. Either of the reaction mechanisms is affected when a solid sorbent is introduced into the liquid pyrolysis process. Chloride radicals or hydrogen chloride have affinity toward an alkaline earth surface. A sodium or calcium molecule interrupts new-born chloride free radicals reacting with a hydrocarbon. A sodium or calcium molecule may also directly react with a hydrogen chloride intermediate before it combines with pyrolytic product molecule. A sorbent use condition is further taught below. An optimal condition exits for how to apply a sorbent.

The melting reactor forms a first vapor stream 2 and a first liquid stream 3 from feed 1. The first liquid stream 3 contains a mixed plastic melt, with most of chloride removal in vapor stream 2. First liquid stream 3 is sent to the main pyrolysis reactor 102. The main pyrolysis reactor provides enough residence time for all mixed plastic to convert first liquid stream 3 to a designated product slate. The main pyrolysis reactor may operate at a temperature from about 300° C. (572° F.) to about 550° C. (1022° F.), or preferably about 380° C. (716° F.) to about 450° C. (842° F.), a pressure from about 0.069 MPa (gauge) (10 psig) to about 1.38 MPa (gauge) (200 psig), or preferably about 0.138 MPa (gauge) (20 psig) to about 0.345 MPa (gauge) (50 psig), a liquid hourly space velocity of the fresh melt feed from about 0.1 $hr^{-1}$ to about 2 $hr^{-1}$, or from about 0.2 $hr^{-1}$ to about 0.5 $hr^{-1}$ more preferably, and under nitrogen blanket or a dedicated nitrogen sweeping stream 4 at a rate of about 17 $Nm^3/m^3$ (100 scf/bbl) to about 850 $Nm^3/m^3$ plastic melt (5,000 scf/bbl), or about 170 $Nm^3/m^3$ (1000 scf/bbl) to about 340 $Nm^3/m^3$ plastic melt (2000 scf/bbl) more preferably.

This invention applies a second step of dechlorination solution designed around the main pyrolysis reactor. A main reactor depolymerizes a variety of polymers. Unconverted PVC melt tank is further converted to hydrogen chloride. A portion of hydrogen chloride reacts with olefinic pyrolysis oil forming organochloride. A portion of hydrogen chloride leaves as a vapor stream 13. A portion of hydrogen chloride leaves as a waste stream carried by reactor bottom residue stream 7, Efficiency of dechlorination, or incremental dechlorination conversion is defined as disappearance of chloride in product chloride mass flow in liquid product leaving to next stage the chloride mass flow coming into main reactor boundary. Achieving higher dechlorination efficiency requires enriching chloride mass flow in liquid stream 7 and vapor stream 13. The efficiency is experimentally known to inventors found in 40-80%, frequently lower than 80%.

To improve dechlorination efficiency further, a finely ground solid sorbent stream 5 may be introduced to the feed at the top of the pyrolysis reactor 102 to increase chloride removal into liquid stream 7. Suitable particle size may be with 90% particles in 1-100 um size range. Sorbents chosen may include naturally occurring alkaline materials, e.g. calcium carbonate, quick lime, or calcium hydroxide-based minerals or product/side product from a mining process. The choice of sorbent agent also depends on its availability, grindability, activity thus usage and cost. Sorbent use in main cracking reactor 102 and thermal dechlorination in melt tank 101 has a synergetic effect. Thermal dechlorination in melt tank is not suitable for 90%+dechlorination conversion. Chloride removal by using a sorbent in main reactor 102 cannot practically exceed incremental conversion more than 90% neither for nonobvious reasons. Intrinsically in order to form CaCl2 as a stable product between sorbent and chloride-containing molecules, the stoichiometry atomic ratio between calcium and chloride needs to be much greater than 2. Typically, the dosage is within 3-6 molar ratio. There exists an optimal molar Ca/Cl ratio, and as a result an optimal chloride conversion in the main reactor 102. A well-mixed reactor is much preferred due to intimate mixing of solid sorbent, liquid molecules that contain chloride or newly formed hydrogen chloride, newly released from the ending chain of pyrolytic reaction. A well-mixed reactor is a benefit compared with a non-mixing extrusion or kiln reactor solely due to liquid/solid mixing. Fine grinding increases sorbent dispersion, however, there is a cost penalty when chasing unrealistic particle size goals, e.g. <10 um as an average. Our proprietary information determines 2.5-4 is considered a more optimal ratio and as a result, 80-90% chloride conversion is more typical subject to reactor mixing and particle size constraints. To further illustrate, when liquid-solid and sorbent size are determined, the ratio of sorbent utilization (defined as a ratio of mass of chloride captured relative to a mass of calcium introduced) is a decreasing trend as function of increasing molar calcium/chloride ratio. The similar trend for sorbent use vs. sorbent to containment ratio is intuitively analogous to a more known but similar commercial scenario, such as a use of calcium oxide is typically applied to absorb SOx emitted from a fossil fuel fired reactor (an example is shown by: processing and Utilization of High-Sulfur Coals V: Proceedings of the Fifth edited by B. K. Parekh, J. G. Groppo, page 426, FIG. 3). Due to more chloride from the system, more sorbent has to be introduced. However more sorbent addition runs into another limitation. Intrinsically waste plastic pyrolysis depolymerizes large polymer molecules from a few thousands or beyond to a few tens or hundreds in molecular weight (E.g. grams per moles). Pyrolytic products are therefore extremely volatile. As an estimate, a majority of feed converts to a vapor product leaving in stream 6. A much smaller fraction of the feed leaves as a residue stream in liquid phase. The mass ratio between stream 6 and steam 7 may be 2.3-9. For one part of the sorbent added to the feed, the concentration factor (defined as wt % solids in residue stream 7 ratio to wt % solids in feed to the main reactor 2) is 3.3 to 10-fold. Typically, there is a need to limit solid sorbent in reactor residue. As a result, dechlorination through sorbent-chloride reaction in main reactor has a conversion limitation, e.g. 80-90% due to constraints on calcium use. In one exemplary case, limiting spent sorbent to 5% wt in a reactor residue stream was found more preferred, with sorbent to removal chloride ratio 2.5-4, by adding a sorbent to pyrolysis reactor, incremental reactor dechlorination is the most optimal when ~90% chloride removal is done by melt tank and followed by another 90% removal at main reactor.

In a practical sense, the efficiency of chloride removal to achieve <10 ppmw, or preferably <5 ppmw Cl requires maximizing dechlorination efficiency at each reactor steps, e.g. >90%. Neither a combination of the melt thermal dechlorination in the melt tank and main reactor fixation by removing vapor and rejecting reactor residue, nor a combination of the melt thermal dechlorination in the melt tank and main reactor fixation by removing vapor and rejecting reactor residue with sorbent enhancement, can achieve <10 ppmw chloride, or preferably <5 ppmw in product. This is increasingly the case when feed PVC content is >1%. When this is the case, another removal step is necessary as described below.

The pyrolysis reactor contains liquid in phase equilibrium with the vapor product stream. A portion of the liquid stream 8 may be sent to a circulation pump. The pumped stream may be split off to stream 9 and stream 10. The mass flow of stream 9 may be such that it sustains the melting reactor temperature as described above by mixing with the melted plastic. Stream 9 also may serve to reduce the polymer melt viscosity. The mass flow of stream 10 may be such that it obtains all of the enthalpy requirements via the heater 106 when returning to pyrolysis reactor 102 through stream 11. Necessary heat transfer is achieved by mixing hot stream 11 and cold stream 3 in main pyrolysis reactor 102. The pyrolysis reactor 102 may draw a second vapor product stream 6 from the top of the pyrolysis reactor and a second solid rich product stream 7 from the bottom of the reactor. Convective heat transfer inside pyrolysis reactor 102 along with mixing from pumping around stream 11 provides uniform heating, an advantage over pyrolysis reaction methods heated via external indirect heating, commonly seen in extrusion or rotary kiln reactors. Stream 7 contains chloride, when sorbent is introduced higher amount of stream 7 is contained, chloride leaving in stream 7 is counted as contributions to Cl removal efficiency.

FIG. 1 further illustrates vapor product flow 6, which contains a range of hydrocarbons carried by a nitrogen flow at a designed vapor linear velocity. Vapor product flow 6 may contact a cooling medium directly or indirectly and then be separated to a vapor stream 13 and a liquid stream 15. When direct water contact is involved as one possible cooling methods, an aqueous stream is collected at stream 14. When direct water contact is omitted, stream 14 may not exist. Chloride carried in streams 13 and stream 14 is counted as contributions to Cl removal efficiency. The liquid stream 15 is further a heated stream 16 and flashed in flash drum 104 to produce a stabilized liquid stream 19. The vapor stream 17 is at a higher pressure than separator 103 and is pressured back to separator 103 to enhance recovery of hydrocarbons in the desired product. The stream is mixed with stream 12 to avoid needing multiple inlet nozzles on separator 103. The stabilized liquid stream 19 is further cooled to a desired temperature in stream 19 before it enters an adsorbent system 105A and 105B. The adsorbent system 105A and 105B runs as a further and final chloride polishing device. Above mentioned each dechlorination steps works at its own practical and optimal operating efficiency window. Synergy exists between the two when a combination of a stirred circulation oil heated dechlorination melting reactor, main pyrolysis reactor with optional sorbent enhancement is not sufficient for achieving a 10 ppmw Cl target, or preferably <5 ppmw. The feed may contain more PVC than 2%, when requiring Cl removal performance to increase, making the melt tank bigger, making the main reactor bigger or enhancing it by introducing more sorbent into the main reactor, is unlikely to be economical, a third consecutive step is needed involving an adsorbent use. The third operation uses an adsorbent dedicated for chloride polishing. While naturally occurring adsorbent may be applied, engineered adsorbents are preferred. Preferably specially engineered adsorbents with high adsorbent capacity and activity are used. Adsorbent capacity is a quantity that a max accumulative mass amount of chloride retained relative to the mass of adsorbent to be replaced when no further chloride removal can be achieved. Adsorbent activity is defined by the temperature required to achieve a fixed product chloride content (when absorbent quantity and feed flow rate are both fixed) or by the quantity of adsorbent required (when temperature and feed flow rate are both fixed). Either lower temperature is required, or lower quality of adsorbent required indicates a higher activity. A range of metal oxides may suit solely for adsorbing organochloride. More preferably the adsorbent contains an alkaline earth metal impregnated on alumina. It provides an engineering balance between activity and capacity with proprietary testing data. Manufacturing of an engineered adsorbent is beyond this invention. This invention teaches its suitability in this application. The desired activity is the volumetric installation of the adsorbent relative the pyrolysis process flow rate. For example, the relative volume of an adsorbent bed may be 1-4 times of flow rate of pyrolytic volumetric flow at an hourly basis for a chloride content range of 10-1000 ppw in product stream for achieving a ~90% incremental dechlorination efficiency.

When a feed contains high PVC content, the adsorbent bed is needed to reduce chloride down to 10 ppmw or below. The adsorbent bed needs to be minimized in size to retain best practical economics. It works best only when ~90% efficiency is already achieved at dechlorination reactor, and/or ~90% incremental efficiency is already achieved at sorbent removal in main dechlorination reactor. An adsorbent bed has its own constraints when calling for increasing in removal efficiency. When temperature and feed flow rate are fixed, an increase in adsorbent quality is needed due to activity constraints. The increase in quality is disproportionate when calling for higher removal efficiency due to diminishing gain in efficiency or incremental dechlorination conversion when residence time is increased. Alternatively, when adsorbent quality and feed flow rate are fixed, an increase in operating temperature is needed due to activity constraints. The increase in temperature is frequently prohibitive when calling for higher removal efficiency due not only to diminishing gain in incremental dechlorination conversion but also due to rapid increase in side reactions, e.g. carbon deposition at the adsorbent that leads to premature deactivation or a reduction in ultimate capacity. With such constraints, we teach the adsorbent operating condition is better limited to 97% in incremental dechlorination conversion, or preferably no greater than 95%, or more preferably to an even lower value when capping the operating temperature and maintaining a reasonable quality of adsorbent. From practical design considerations, a reasonable measure of the quality of adsorbent is a weight hourly space velocity which is defined as mass hourly flow of total pyrolysis oil flow relative to mass of adsorbent to be replaced after a consecutive one-year operation. The weight hourly space velocity is considered as practical when it is >0.1, more preferably >0.5. Therefore, synergy is found by this invention that by optimizing the use the three steps, by using the stirred dechlorination reactor, sorbent in main reactor and adsorbent bed to achieve less than 10 ppmw Cl in product when feed PVC content is >1%. Solely using one single technique diminishes the efficiency and economics of dechlorination. Solely increasing dechlorination reactor size, increasing sorbent use and increase adsorbent amount or operating temperature cannot practically and economically achieve the same objective.

When the adsorbent bed choice is by this invention's teaching, the adsorbent reactor may operate at a temperature from about 100° C. (212° F.) to about 300° C. (572° F.), or preferably about 120° C. (248° F.) to about 200° C. (392° F.), a pressure from about 0.069 MPa (gauge) (10 psig) to about 2.07 MPa (gauge) (300 psig), or preferably about 0.138 MPa (gauge) (20 psig) to about 1.38 MPa (gauge) (200 psig), a liquid hourly space velocity of the fresh melt feed from about 0.05 $hr^{-1}$ to about 5 $hr^{-1}$, or more preferably from about 0.1 $hr^{-1}$ to about 2 $hr^{-1}$.

As previously mentioned herein, this disclosure provides for stepwise chloride removal. Single step chloride removal may have efficiency issues in chloride removal when a mixed plastic feed has elevated PVC content, e.g., 2% or more. Melting reactor 101 first removes over 90% by weight of chloride in the mixed plastic feed by decomposing the PVC in the melting reactor. This chloride is removed as hydrogen chloride. A fraction of the remaining chloride is removed in pyrolysis reactor 102 where a sorbent is added to convert a fraction of the chloride as a salt. Unconverted hydrogen chloride is further diluted in a sweeping nitrogen flow where gas-phase recombination reactions between hydrogen chloride and organic molecules are minimized. The steps mentioned above in this section may be designed to remove a majority of the chloride, preferably down to below 200 ppmw in stream 19. Two parallel adsorbent system 105A and 105B is suitable to remove chloride to near zero concentration or no more than 10 ppmw in final product. Adsorbent system 105A and 105B runs with an identical backup bed to avoid chloride breakthrough. The resulting salt in adsorbent system 105A and 105B is considered as spent and is removed while the other vessel is running online. This allows the unit to be run continuously, a benefit over batch processes. Each chloride control step has an optimal chloride concentration in feed and efficiency limitation. Designing an overly sized dechlorination reactor, or enhancing reactor dechlorination by using additional sorbent injection to reactor or use of gaseous dilution is known to come to uneconomical gain with increasing dosage when passing a certain efficiency threshold such as 90%, e.g., when seeking down to a level lower than about 200-400 ppm Cl in product, excessively large dechlorination reactor or significant increase in use of sorbent may be needed, leading to economical penalty and difficulty in proper distribution of sorbent. Adsorbent bed is more suitable and economical only as a final polish, i.e. bringing chloride content from 200-400 ppm down to <~10 ppm in final product. Similarly, any chloride increase in adsorbent bed feed can lead to excessively large use of adsorbent. Therefore, among the stepwise dechlorination, it may prove sorbent injection to reactor is critical to bring chloride content from a few thousands part per million down to a couple of hundreds. The cleaned product stream 21 is cooled as a stream 22 and stored in product storage 108. If desired, stream 22 can be fractionated into to two or more streams according to their boiling points before being sent to storage.

The total vapor stream 13 may contain a variety of gaseous species. In particular, it may contain nitrogen, any residual moisture from the feed, hydrogen chloride, carbon dioxide from polyethylene terephthalate conversion, methane, ethane, propane, ethylene, propylene and heavier hydrocarbon vapors from plastic pyrolysis reaction. The heat value as quite high, frequently on the order of 30,000 KJ/kg. The burning of the gas is necessary before gas cleanup, but it also provides a useful heat source for the process. The heat of combustion is utilized in the heat exchanger built into unit 106. After incineration, the off-gas stream 23 is sent to a clean-up system 107 where any dioxin is removed in a carbon bed and hydrogen chloride is scrubbed out either using caustic, sodium bicarbonate or other materials that react with HCl to produce cleaned stream 24.

The magnitude of the heat of reaction in pyrolysis reactor 102 is about 2-3-fold higher than the heat of reaction in the melting reactor. After pyrolysis, polymer molecules are significantly cracked to the product molecules. Smaller product molecules mostly leave as the second vapor stream 6 at the pyrolysis reactor top. Product vapor stream 6 leaves quickly with the assistance of sweeping gas 4. Sweeping gas 4 is introduced to the pyrolysis reactor 102. Secondary cracking is a term to describe primary pyrolysis products being cracked further through additional residence time under pyrolysis condition. The latent heat requirement to vaporize the product and provide the heat of reaction for the pyrolysis reaction is all supplied by heat carried from stream 11.

Figure 2:
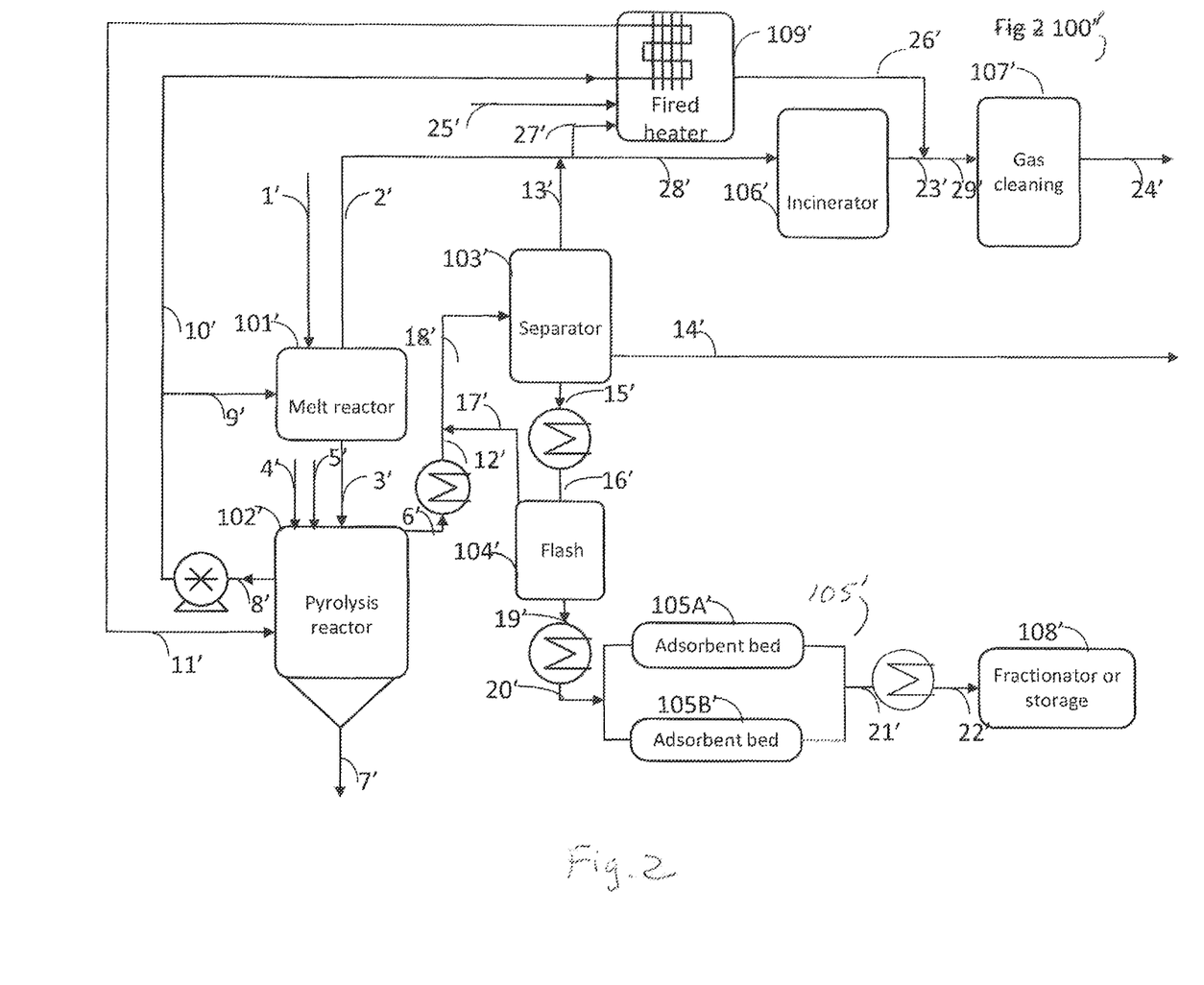
FIG. 2 is a schematic diagram of alternative process and an apparatus for pyrolyzing a mixed plastic stream in accordance with an exemplary embodiment.

FIG. 2 is a modification on the embodiment shown in FIG. 1. All of the element numbers are shown with a quote mark to show that with few exceptions the element numbers have the same meaning as in FIG. 1. The main difference is that there is a separate fired heater 109' that burns a liquefied petroleum gas or natural gas to heat up recirculation oil stream 10'. Further the fired heater off-gas stream 26' may be further combined with incinerator off-gas clean up. Further the reactor off-gas streams 2' and 13' may be blended and split a sub stream 27' to supplement fuel consumption in 109'.

EXAMPLE

Example 1

Chloride mass balance studies are presented. The calculation is based on experimental data collected for melt tank dechlorination, sorbent performance and adsorbent performance. An experiment done at 320° C., feed PVC 1%, 2% or 3%, product Cl<10 ppmw. Three steps are taken in series, showing melt tank size, sorbent use and adsorbent use. The example is scaled to 1 ton/year feed flow basis. The data shows that if only one single step of chloride removal is used, a very large reactor, or large sorbent use and adsorbent use are needed (see ratios of melt tank size to reactor size to the one in three steps in series). This Example explains how using three steps in series provides synergy as compared with any or two of the three steps.

| I. Information inputs | | | |
|---|---|---|---|
| Ca(OH)2 Molecular weight, g/moles | 74 | 74 | 74 |
| CL Molecular weight, g/moles | 35 | 35 | 35 |
| Feed flow t/hr, scaled | 1 | 1 | 1 |
| Study cases | 1 | 2 | 3 |
| Feed PVC, wt % | 1 | 3 | 6 |
| Feed PVC, kg/hr | 10 | 30 | 60 |
| Cl in feed, ppmw | 5672 | 17016 | 34032 |
| RX size, main reactor size is scaled as 1 hour residence time | | | |

| II. 1st step at melt tank | | | |
|---|---|---|---|
| Cl removal [1- (Cl in melt tank product)/(feed Cl)] | 90% | 90% | 90% |
| RX size need, residence time, hours, proprietary data | 0.7 | 0.7 | 0.7 |
| Cl removed down to, ppmw feed basis | 567 | 1702 | 3403 |

| III. 2nd step at main reactor | | | |
|---|---|---|---|
| Cl removal [1-(Cl in main reactor product)/(feed Cl to main reactor)] | 90% | 90% | 90% |
| Cl left from step 2 ppmw feed basis | 56.7 | 170.2 | 340.3 |
| Ca/CL molar ratio | 3 | 3 | 3 |
| Sorbent use, ppmw feed basis | 3196.8 | 9590.4 | 19180.8 |
| Mass concentration of sorbent due to residue yield left after cracking/feed | 10 | 10 | 10 |
| Sorbent spent conc, ppw in residue, feed basis | 31968 | 95904 | 191808 |
| Sorbent spent conc, wt % in residue, feed basis | 32 | 96 | 192 |

| IV. 3rd step at adsorbent bed | | | |
|---|---|---|---|
| adsorbent use | 82% | 94% | 97% |
| Cl left from step 3 | 10 | 10 | 10 |
| Capacity g of Cl/g of sorbent | 28% | 28% | 28% |
| Adsorbent use 1 year 8400 hrs, kg/year: 1 ton/hr unit | 1402 | 4805 | 9910 |
| Adsorbent bed, wt of adsorbent/wt/hr of pyrolysis flow | 0.71 | 0.21 | 0.10 |

| V. Below are comparisons relative to non-synergized case if by single step, either of the 3 | | | |
|---|---|---|---|
| Single stage efficiency need | 99.82% | 99.94% | 99.97% |
| RX size need, hr if by single melt tank, proprietary data | 4 | 13 | 30 |
| Ratio to melt tank, 3 steps in series in synergy case | 6 | 19 | 43 |
| Sorbent use, ppmw | 35457 | 106497 | 213057 |
| Sorbent spent conc, wt % in residue | 35 | 106 | 213 |
| Ratio of sorbent use to 3 steps in series in synergy case | 11 | 11 | 11 |
| adsorbent only, 1 year 8400 hrs, kg/year: 1 ton/hr unit | 161771 | 485886 | 972057 |
| Ratio to Adsorbent bed in 3 steps in series in synergy case | 115 | 101 | 98 |

Example 2

A recycle plastic stream was obtained from a Wisconsin material recovery facility. The compositions are 2% wt PVC, 20% PE, 75% PP, the remaining being PET, paper, organic residue, and metal species. Cl measured in feed is 1.189wt % Cl.

Step 1: A 100 grams of the feed was batch pyrolysised in a 500 cc reactor under conditions of atmospheric pressure ~25 psig. The reactor was heated from ambient condition to 300C. hold for 2 hours. After shutdown, the reactor content was solidified, recovered and measured (namely, first stage liquid product).

Step 2. The same feed was tested identical testing conditions as step 1. After holding at 300C for 2 hours. The reactor continued to raise to 400° C., held for one hour. After cooled, the product produced out of the pyrolysis reaction was collected in an ice-cooled condenser. 67 grams of products were collected (namely, total pyrolysis product). A few runs were repeated as step 2 to accumulate ~300 gm of liquid product (namely, combined total pyrolysis product).

Step 3. The total pyrolysis product was flowing to a continuous fixed bed reactor, a 3 cc UOP proprietary commercial adsorbent was used. An equal volume per hour to volume of adsorbent was used at <300° C. condition with a pressure of <200 psig. The collected product (namely, final pyrolysis oil product) was measured for Cl. The example demonstrated dechlorination efficiency observed for practical stepwise process to achieved a less than 10 ppmw or preferably <6 ppm Cl.

| Stream | Process step | mass recovered on 100 gms of feed basis, gms | Cl content, ppmw | mass Cl, gms left | Cl efficiency |
|---|---|---|---|---|---|
| Feed | Feed | 100 | 11888 | 1.19 | n/a |
| First stage liquid product | Melt/dechlorination reactor | 96 | 6443 | 0.62 | 48% |
| 2nd liquid product | main pyrolysis reactor | 67 | 1897 | 0.13 | 79% |
| final pyrolysis oil product | adsorbent bed | 67 | 4 | 0.00027 | 99.79% |

SPECIFIC EMBODIMENTS

While the following is described in conjunction with specific embodiments, it will be understood that this description is intended to illustrate and not limit the scope of the preceding description and the appended claims.

A first embodiment of the invention is a process for producing low-chloride pyrolysis oil out of a mixed plastic waste stream comprising three chloride removal steps operating in series; melting the mixed plastic waste stream with a hot product stream in a melting reactor to produce a melted mixed plastic waste stream comprising at least two types of plastic including chlorine-containing plastics and other plastics to produce a first chloride-rich vapor stream and a first liquid stream; sending the first liquid stream to a pyrolysis reactor to be heated with a hot product stream to produce a second chloride rich vapor stream, a second liquid stream and solid particles; adding a sorbent to the pyrolysis reactor to adsorb chloride containing molecules; sending part of the second liquid stream, comprising a circulation stream from the pyrolysis reactor, to the melting reactor and sending a part of the second liquid stream from the pyrolysis reactor to be heated and returned to the pyrolysis reactor; and passing main pyrolysis condensates through an adsorbent bed to remove residual chloride down to 10 ppmw. An embodiment of the invention is one, any or all of prior embodiments in this paragraph up through the first embodiment in this paragraph wherein the first chloride-rich vapor stream is sent to a gas cleaning zone. An embodiment of the invention is one, any or all of prior embodiments in this paragraph up through the first embodiment in this paragraph wherein the melting reactor is operated at a temperature from about 280° C. (536° F.) to about 330° C. (626° F.), the pyrolysis reactor is operated at a temperature from about 380° C. (716° F.) to about 450° C. (842° F.) and an adsorbent bed is operated at a temperature from about 100° C. (212° F.) to about 300° C. (572° F.). An embodiment of the invention is one, any or all of prior embodiments in this paragraph up through the first embodiment in this paragraph wherein the sorbent is a ground alkaline material present in about a 2.5-4 molar ratio to the chloride in the pyrolysis reactor with <3% wt relative to plastic melt. An embodiment of the invention is one, any or all of prior embodiments in this paragraph up through the first embodiment in this paragraph wherein the melting reactor is operated at a pressure from about 0.069 MPa (gauge) (10 psig) to about 1.38 MPa (gauge) (200 psig) and a liquid hourly space velocity from about 0.1 hr$^{-1}$ to about 2 hr$^{-1}$ and is operated under a nitrogen blanket at a dedicated nitrogen sweeping rate of about 1.7 Nm$^3$/m$^3$ (10 scf/bbl) to about 170 Nm$^3$/m$^3$ of plastic melt (1,000 scf/bbl); the pyrolysis reactor is operated at a pressure from about 0.069 MPa (gauge) (10 psig) to about 1.38 MPa (gauge) (200 psig) and a liquid hourly space velocity of the first liquid stream from about 0.1 hr$^{-1}$ to about 2 hr$^{-1}$ and is operated under a nitrogen blanket or a dedicated nitrogen sweeping stream at a rate of about 17 Nm$^3$/m$^3$ (100 scf/bbl) to about 850 Nm$^3$/m$^3$ plastic melt (5,000 scf/bbl). and the adsorbent bed is operated pressure from about 0.069 MPa (gauge) (10 psig) to about 2.07 MPa (gauge) (300 psig) and a liquid hourly space velocity of the fresh melt feed from about 0.05 hr$^{-1}$ to about 5 hr$^{-1}$. An embodiment of the invention is one, any or all of prior embodiments in this paragraph up through the first embodiment in this paragraph further comprising sending the second vapor stream to a cooler and to a separator to produce a third vapor stream and a third liquid stream. An embodiment of the invention is one, any or all of prior embodiments in this paragraph up through the first embodiment in this paragraph wherein about 80 to 95 wt. % of chloride from the melting reactor is removed and sent in the vapor stream. An embodiment of the invention is one, any or all of prior embodiments in this paragraph up through the first embodiment in this paragraph wherein the third liquid stream comprises less than about 200 ppmw chloride. An embodiment of the invention is one, any or all of prior embodiments in this paragraph up through the first embodiment in this paragraph wherein the third liquid stream is sent to an adsorbent bed to remove chloride. An embodiment of the invention is one, any or all of prior embodiments in this paragraph up through the first embodiment in this paragraph wherein the heat of reaction in the pyrolysis reactor is about 2-3 times higher than the heat or reaction in the melting reactor. An embodiment of the invention is one, any or all of prior embodiments in this paragraph up through the first embodiment in this paragraph wherein the heat needed in the melting reactor is supplied by mixing part of a second liquid stream. An embodiment of the invention is one, any or all of prior embodiments in this paragraph up through the first embodiment in this paragraph wherein the heat needed in the main reactor is supplied by mixing part of a heated second liquid stream. An embodiment of the invention is one, any or all of prior embodiments in this paragraph up through the first embodiment in this paragraph wherein the circulation of part of a heated second liquid stream provides liquid and sorbent mixing. An embodiment of the invention is one, any or all of prior embodiments in this paragraph up through the first embodiment in this paragraph wherein the gas cleaning zone comprises a catalyst bed to remove dioxin compounds and a vessel containing caustic compounds to neutralize HCl.

A second embodiment of the invention is a process for pyrolysis of a mixed plastic waste stream comprising sending the mixed plastic waste stream to a melting reactor to produce a first vapor stream that is chloride-rich and a first liquid stream; sending the first liquid stream to a pyrolysis reactor to be heated to produce a second vapor stream, a second liquid stream and solid particles and wherein solid particles move in a downward direction within the pyrolysis reactor; sending the first vapor stream to an incinerator and then to a gas cleaning zone to remove chloride compounds and to heat at least a portion of the circulation supply stream as a reaction heat supply for the pyrolysis reactor; and cooling and separating the second vapor stream into a third vapor stream and a third liquid stream and then treating the third liquid stream in at least one adsorbent bed to remove chlorine containing impurities. An embodiment of the invention is one, any or all of prior embodiments in this paragraph up through the second embodiment in this paragraph further comprising sending an adsorbent to the pyrolysis reactor to remove chlorine compounds. An embodiment of the invention is one, any or all of prior embodiments in this paragraph up through the second embodiment in this paragraph wherein the chlorine-containing plastic is polyvinyl chloride and the other plastics are selected from polyethylene terephthalate, low-density and high-density polyethylene, polypropylene, polystyrene and other miscellaneous plastics. An embodiment of the invention is one, any or all of prior embodiments in this paragraph up through the second embodiment in this paragraph wherein the gas cleaning zone comprises a catalyst bed to remove dioxin compounds and a vessel containing caustic compounds to neutralize HCl. An embodiment of the invention is one, any or all of prior embodiments in this paragraph up through the second embodiment in this paragraph further comprising sending an adsorbent to the pyrolysis reactor to adsorb chlorine and chlorine containing compounds. An embodiment of the invention is one, any or all of prior embodiments in this paragraph up through the second embodiment in this paragraph wherein the adsorbent is an alkaline material present in about a 2-3 molar ratio to the chloride in the pyrolysis reactor. An embodiment of the invention is one, any or all of prior embodiments in this paragraph up through the second embodiment in this paragraph wherein the adsorbent further functions as a flocculation material for carbonaceous char particles formed during operation of the pyrolysis reactor.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for producing a pyrolysis oil out of a mixed plastic waste stream comprising
   a. sending the mixed plastic waste stream comprising at least two types of plastic including chlorine-containing plastics and other plastics to a melting reactor to produce a first vapor stream and a first liquid stream;
   b. sending said first liquid stream to a pyrolysis reactor to be heated to produce a product comprising vapor, liquid, and solid particles;
   c. withdrawing a second vapor stream, a second liquid stream, and a residue stream comprising the solid particles from said pyrolysis reactor;
   d. circulating a part of the second liquid stream to said melting reactor and sending a part of the second liquid stream to be heated and returned to said pyrolysis reactor as a heated second liquid stream; and
   e. cooling and separating the second vapor stream into a third vapor stream and a third liquid stream and then passing the third liquid stream through an adsorbent bed to remove residual chloride to produce said pyrolysis oil.

2. The process of claim 1 further comprising adding a sorbent to said pyrolysis reactor to adsorb chloride-containing molecules.

3. The process of claim 2 wherein said sorbent is a ground alkaline material present in about a 2.5-4 molar ratio to the chloride-containing molecules in said pyrolysis reactor and in an amount of <3% wt relative to plastic melt.

4. The process of claim 1 wherein said first vapor stream is sent to a gas cleaning zone.

5. The process of claim 4 wherein said gas cleaning zone comprises a catalyst bed to remove dioxin compounds and a vessel containing caustic compounds to neutralize HCl.

6. The process of claim 1 wherein said melting reactor is operated at a temperature from about 280° C. (536° F.) to about 330° C. (626° F.), said pyrolysis reactor is operated at a temperature from about 380° C. (716° F.) to about 450° C. (842° F.) and said adsorbent bed is operated at a temperature from about 100° C. (212° F.) to about 300° C. (572° F.).

7. The process of claim 1 wherein said melting reactor is operated at a pressure from about 0.069 MPa-gauge (10 psig) to about 1.38 M Pa-gauge (200 psig) and a liquid hourly space velocity from about 0.1 $hr^{-1}$ to about 2 $hr^{-1}$ and is operated under a nitrogen blanket or a dedicated nitrogen sweeping rate of about 1.7 $Nm^3/m^3$ (10 scf/bbl) to about 170 $Nm^3/m^3$ (1,000 scf/bbl); said pyrolysis reactor is operated at a pressure from about 0.069 M Pa-gauge (10 psig) to about 1.38 MPa-gauge (200 psig) and a liquid hourly space velocity from about 0.1 $hr^{-1}$ to about 2 $hr^{-1}$ and is operated under a nitrogen blanket or a dedicated nitrogen sweeping stream at a rate of about 17 $Nm^3/m^3$ (100 scf/bbl) to about 850 $Nm^3/m^3$ (5,000 scf/bbl); and said adsorbent bed is operated pressure from about 0.069 MPa-gauge (10 psig) to about 2.07 MPa-gauge (300 psig) and a liquid hourly space velocity from about 0.05 $hr^{-1}$ to about 5 $hr^{-1}$.

8. The process of claim 1 wherein said third liquid stream comprises less than about 200 ppmw chloride.

9. The process of claim 1 wherein a heat of reaction in said pyrolysis reactor is about 2-3 times higher than a heat of reaction in said melting reactor.

10. The process of claim 9 wherein the heat of reaction in the melting reactor is supplied by the part of the second liquid stream.

11. The process of claim 9 wherein the heat of reaction in the pyrolysis reactor is supplied by the heated part of the second liquid stream.

12. A process for pyrolysis of a mixed plastic waste stream comprising:
   a. sending the mixed plastic waste stream to a melting reactor to produce a first vapor stream and a first liquid stream;
   b. sending the first liquid stream to a pyrolysis reactor to be heated to produce a product comprising vapor, liquid, and solid particles, wherein the solid particles move in a downward direction within said pyrolysis reactor;
   c. withdrawing a second vapor stream, a second liquid stream, and a residue stream comprising the solid particles from said pyrolysis reactor, wherein a mass ratio between said second vapor stream and said residue stream is 2.3 to 9;
   d. cooling and separating said second vapor stream into a third vapor stream and a third liquid stream and then treating said third liquid stream in at least one adsorbent bed to remove chlorine containing impurities;
   e. mixing a portion of the second liquid stream with the mixed plastic waste stream in the melting reactor providing temperatures needed to produce the first vapor stream; and
   f. sending a portion of the second liquid stream to an external heater to produce a heated stream and sending the heated stream back to mix with the first liquid stream before said mixed stream enters said pyrolysis reactor.

13. The process of claim 12 further comprising sending said first vapor stream to an incinerator and then to a gas cleaning zone to remove chlorine compounds, and wherein the incinerator is the external heater which heats the portion of said second liquid stream as a reaction heat supply for said pyrolysis reactor.

14. The process of claim 13 wherein said gas cleaning zone comprises a catalyst bed to remove dioxin compounds and a vessel containing caustic compounds to neutralize HCl.

15. The process of claim 12 further comprising sending an adsorbent to said pyrolysis reactor to remove chlorine compounds.

16. The process of claim 15 wherein said adsorbent is an alkaline material present in about a 2-3 molar ratio to the chloride compounds in said pyrolysis reactor.

17. The process of claim 15 wherein said adsorbent further functions as a flocculation material for carbonaceous char particles formed during operation of the pyrolysis reactor.

18. A process for pyrolysis of a mixed plastic waste stream comprising:
   a. sending the mixed plastic waste stream to a melting reactor to produce a first vapor stream and a first liquid stream;
   b. sending the first liquid stream to a pyrolysis reactor to be heated to produce a product comprising vapor, liquid, and solid particles, wherein the solid particles move in a downward direction within said pyrolysis reactor;
   c. withdrawing a second vapor stream, a second liquid stream, and a residue stream comprising the solid particles from said pyrolysis reactor;
   d. sending a portion of said second liquid stream to a heat exchanger and recycled to said pyrolysis reactor and sending a second portion of said second liquid stream to said melting reactor; and
   e. cooling and separating said second vapor stream into a third vapor stream and a third liquid stream and then treating said third liquid stream in at least one adsorbent bed to remove chlorine containing impurities.

\* \* \* \* \*